(No Model.) 2 Sheets—Sheet 1.
J. MÜLLER.
HEATING WATER BY EXHAUST STEAM.
No. 247,096. Patented Sept. 13, 1881.
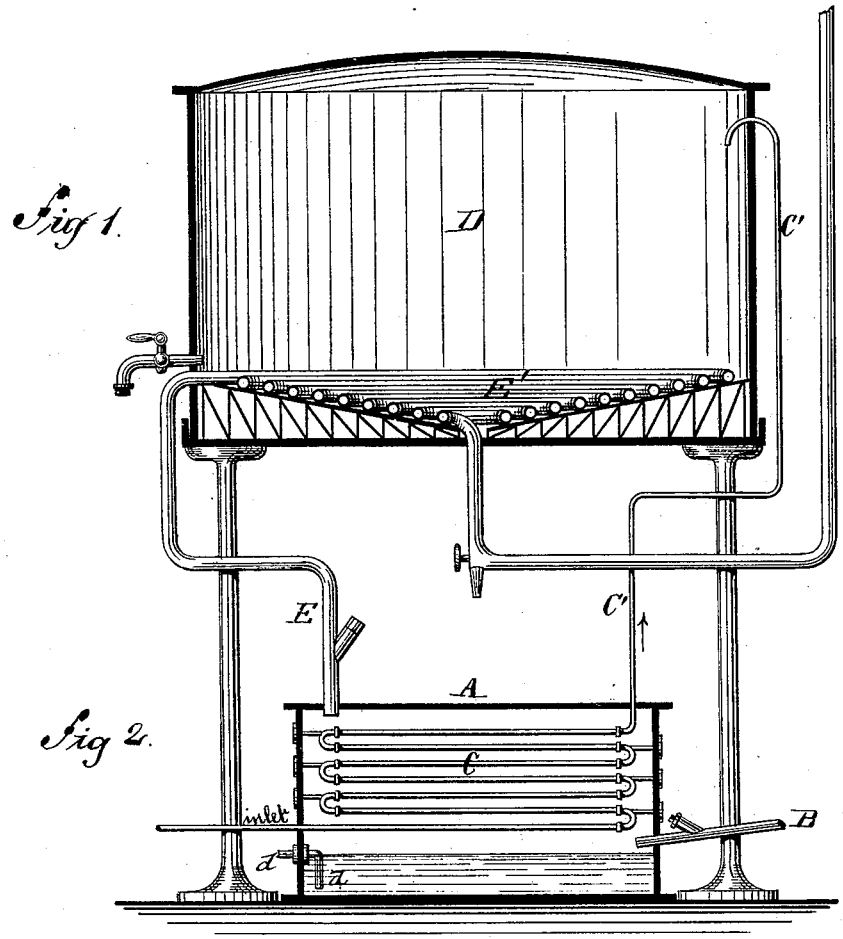
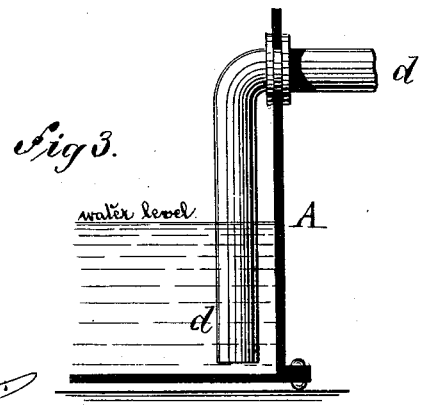
WITNESSES:
Otto Risch
Joh. K. Rosenbaum
INVENTOR
Jacob Müller
BY Paul Goepel
ATTORNEY
N. PETERS. Photo-Lithographer, Washington, D. C.

(No Model.) 2 Sheets—Sheet 2.
J. MÜLLER.
HEATING WATER BY EXHAUST STEAM.
No. 247,096. Patented Sept. 13, 1881.
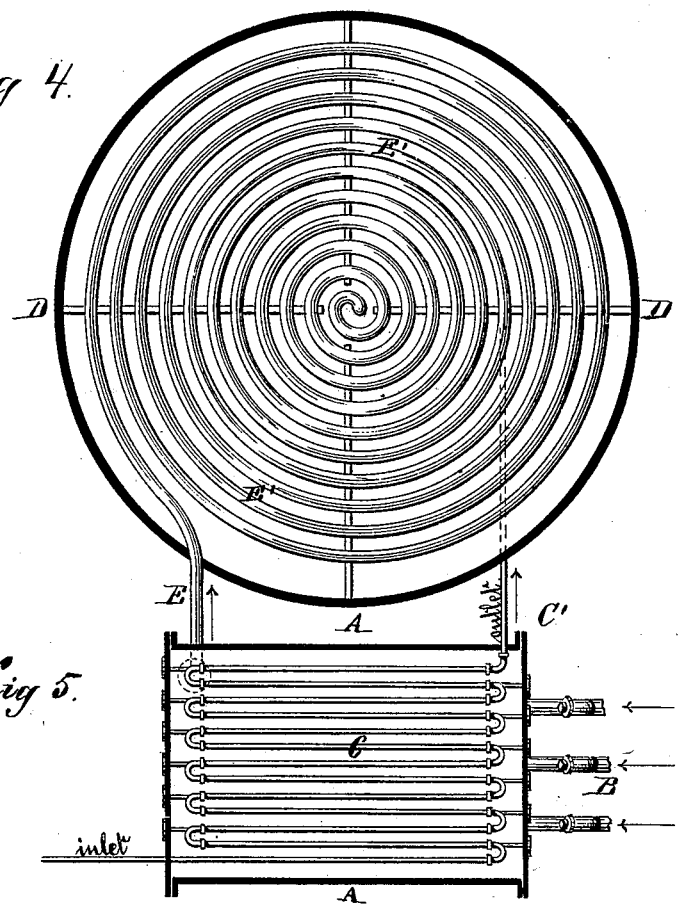
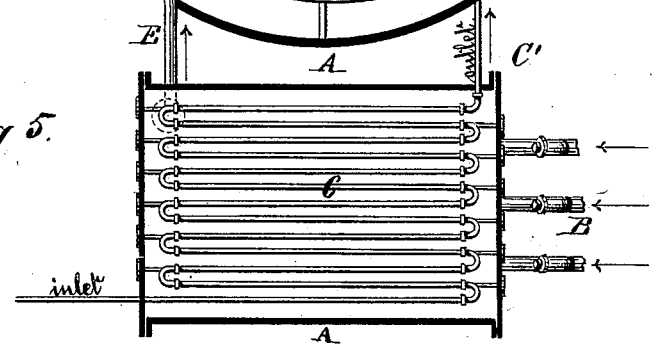
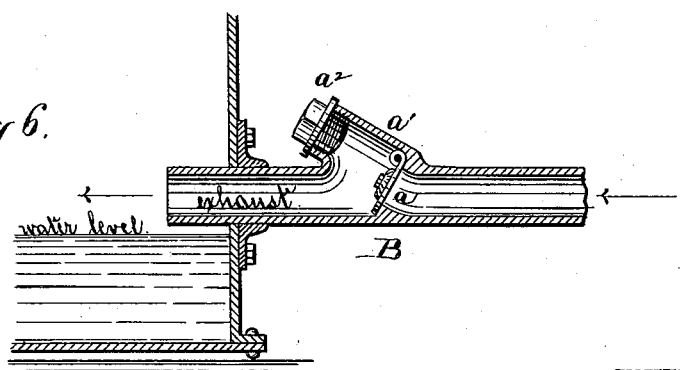
WITNESSES:
Otto Risch
Joh. N. Rosenbaum.
INVENTOR
Jacob Müller
BY Paul Goepel.
ATTORNEY

UNITED STATES PATENT OFFICE.

JACOB MÜLLER, OF NEW YORK, N. Y.

HEATING WATER BY EXHAUST-STEAM.

SPECIFICATION forming part of Letters Patent No. 247,096, dated September 13, 1881.

Application filed June 7, 1881. (No model.)

*To all whom it may concern:*

Be it known that I, JACOB MÜLLER, of the city, county, and State of New York, have invented certain new and useful Improvements in Apparatus for Heating Water by Exhaust-Steam, of which the following is a specification.

This invention relates to an improved apparatus for heating water by exhaust-steam preparatory to its use in breweries, distilleries, or other manufacturing establishments, so as to dispense with the use of live steam for this purpose; and the invention consists of the combination of a closed drum or vessel, into which the different exhaust-pipes from the steam-cylinders of pumps, air-compressors, and the like open, said exhaust-pipes being provided with check-valves that close automatically whenever the supply of exhaust-steam is interrupted. Within the closed drum or vessel a series of water-pipes is arranged, through which the water to be heated is conducted, being then passed into a large water-tank. The closed steam-drum is connected with a coil at the bottom of the tank, through which coil the exhaust-steam is conducted, and finally discharged to the outside. The water is first heated in the closed drum, and the temperature thus obtained is preserved, or nearly so, in the closed water-tank by the heat of the coil, being drawn off from the tank whenever required.

In the accompanying drawings, Figures 1 and 2 represent a vertical central section of the water-tank and steam-drum. Fig. 3 is a detail view of the lower part of the drum shown in Fig. 2, showing the discharge-pipe for the water of condensation. Figs. 4 and 5 are plan views of the apparatus, and Fig. 6 is a detail vertical section of the connection of the exhaust-pipe with the first tank or vessel and its check-valve.

Similar letters of reference indicate corresponding parts.

In the drawings, A represents a closed tank, drum, or vessel made of boiler-iron of suitable strength, into which enter, above the highest possible level of the water of condensation, as many exhaust-pipes B as may be connected to the apparatus, according to the number of steam-cylinders used in connection with engines, pumps, or air-compressors in the brewery or other establishment.

The exhaust-pipes B are provided with hinged inclined check-valves $a$, (shown in detail in Fig. 6,) which check valve or valves close automatically by the steam-pressure at the inside of drum A whenever the supply of steam in any one or all of them is interrupted—that is to say, whenever the steam-cylinder which supplies the exhaust-steam is stopped. Above the check-valve $a$ are arranged short inclined tubes $a'$, which are closed by screw-plugs $a^2$, for the purpose of getting at the check-valves in case it should be necessary to clean or repair the same.

The closed drum A is provided with a series of interior water-pipes, C, into which the water enters at one end, passes through all the water-pipes, and leaves at the opposite end, being then conducted by a vertical pipe, $C'$, into a water-tank, D, of suitable capacity, supported above the closed drum A.

The different water-pipes are continued through the end walls of the tank in such a manner that by removing the end screw plugs or caps they may be cleaned in longitudinal direction by a brush or otherwise, as customary in beer-cooling and similar apparatus. The water passing through the connected series of water-pipes C is heated by the exhaust-steam collected in the drum, which steam enters preferably below the pipes, as shown clearly in Fig. 2, so as to pass without obstruction to the opposite end wall of the tank, and then around and between the pipes to the top of the tank, where it is conducted by a conduit-pipe, E, to a spiral coil, $E'$, arranged at the bottom of the storage-tank D, as shown in Figs. 1 and 3. The water of condensation which collects at the bottom of the tank A is drawn off by a siphon-shaped discharge-pipe, $d$, (shown in Fig. 3,) whenever the water-level rises up to the highest point or bend of the same, said highest point being, however, arranged below the discharge-opening of the exhaust-pipes B. In this manner an automatic discharge of the water of condensation takes place without any escape of steam, as the water forms a hydraulic seal for the discharge-pipe $d$.

The coil $E'$ at the bottom of the storage-tank D is preferably supported in such a manner that the convolutions are one below the other, so that the water of condensation is collected and conducted off at the center of the bottom, which is the lowest point of the coil, which is extended through the bottom of the tank to the outside, so as to discharge the water of condensation, and also carry off, through a branch pipe leading out of the building, whatever steam has not been condensed in the passage through the drum A and coil E'.

The storage-tank D is preferably closed at the top, so as to retain the heat, and is provided with a faucet above the coil for drawing off the water at the hottest portion of the tank, for use for mashing or other purposes for which hot water is required.

The advantages of my apparatus are that the exhaust-steam is collected and conducted first through the closed drum, and then through the spiral coil of the storage-tank, and finally to the outside, without any back-pressure, as it is free to escape at the discharge end of the coil. In its passage through the heating and storage tanks the heat of the steam is utilized to its full extent, saving the expense for live steam for this purpose, and keeping thus continually a large supply of hot water on hand for instant use whenever required.

Having thus described my invention, I claim as new and desire to secure by Letters Patent—

1. The combination of a closed drum, tank, or receiver for the exhaust-steam, having a series of connected feed-water pipes, and of a water-reservoir or storage-tank connected with said water-pipes by a discharge-pipe, with a coil for exhaust-steam inside of the storage-tank, said coil having an outlet-pipe into the air, and a pipe-connection with the steam drum or receiver, substantially as set forth.

2. The combination of a closed drum or tank provided with valved exhaust-steam pipes above the level of the water of condensation, of a series of connected water-pipes in the steam-drum, of a storage tank or reservoir having an interior coil, and of pipes for conducting the water from the water-pipes and the steam from the closed drum, respectively, to the water-tank and its coil, substantially as specified.

In testimony that I claim the foregoing as my invention I have signed my name, in presence of two witnesses, this 26th day of May, 1881.

JACOB MÜLLER.

Witnesses:
PAUL GOEPEL,
CARL KARP.